(12) United States Patent  
Senarath et al.

(10) Patent No.: US 8,843,058 B2  
(45) Date of Patent: Sep. 23, 2014

(54) MOBILE RELAY COMMUNICATION SYSTEM

(75) Inventors: Gamini Senarath, Nepean (CA); Hang Zhang, Nepean (CA); Peiying Zhu, Kanata (CA); Wen Tong, Ottawa (CA); Derek Yu, Kanata (CA); David G. Steer, Nepean (CA); Guo-Qiang Q. Wang, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 612 days.

(21) Appl. No.: 12/522,870

(22) PCT Filed: Jan. 11, 2008

(86) PCT No.: PCT/IB2008/000067  
§ 371 (c)(1),  
(2), (4) Date: Jul. 10, 2009

(87) PCT Pub. No.: WO2008/084394  
PCT Pub. Date: Jul. 17, 2008

(65) Prior Publication Data  
US 2010/0248619 A1 Sep. 30, 2010

Related U.S. Application Data

(60) Provisional application No. 60/884,808, filed on Jan. 12, 2007.

(51) Int. Cl.  
*H04B 7/15* (2006.01)  
*H04B 7/26* (2006.01)  
*H04W 56/00* (2009.01)  
*H04W 88/04* (2009.01)  
*H04W 60/00* (2009.01)  
*H04W 16/26* (2009.01)  
*H04W 84/00* (2009.01)  
*H04W 36/08* (2009.01)

(52) U.S. Cl.  
CPC .............. *H04W 88/04* (2013.01); *H04W 16/26* (2013.01); *H04W 84/005* (2013.01); *H04W 36/08* (2013.01); *H04B 7/2606* (2013.01); *H04W 56/0015* (2013.01); *H04W 60/00* (2013.01)  
USPC ....... 455/11.1; 455/7; 455/8; 455/9; 455/436; 455/437

(58) Field of Classification Search  
USPC .................................... 455/436–446, 7–11.1  
See application file for complete search history.

(56) References Cited

U.S. PATENT DOCUMENTS 5,875,402 A 2/1999 Yamawaki  
7,706,390 B2 4/2010 Alapuranen  
(Continued)

FOREIGN PATENT DOCUMENTS

DE 19614925 A1 10/1997  
EP 0615391 A1 * 9/1994 ............... H04Q 7/04  
(Continued)

OTHER PUBLICATIONS

International Search Report for PCT/IB2008/000067, mailed Jun. 30, 2008.  
(Continued)

*Primary Examiner* — Fayyaz Alam  
(74) *Attorney, Agent, or Firm* — Fish & Richardson P.C.

(57) ABSTRACT

A mobile relay system for supporting communications between a fixed station and mobile terminals comprising a plurality of mobile relay stations that are associated with each other and provided on a moving platform, wherein each of the plurality of mobile relay stations is capable of facilitating communications with mobile terminals within communication range and at least one of the plurality of mobile relay stations is further capable of facilitating communications with a fixed station within communication range of the at least one of the plurality of mobile relay stations.

31 Claims, 6 Drawing Sheets

(56) References Cited

U.S. PATENT DOCUMENTS

| | | | |
|---|---|---|---|
| 2003/0050064 A1* | 3/2003 | Davies et al. | 455/441 |
| 2005/0108374 A1* | 5/2005 | Pierzga et al. | 709/223 |
| 2006/0193280 A1 | 8/2006 | Lee et al. | |
| 2008/0108350 A1* | 5/2008 | Hamasaki et al. | 455/436 |
| 2010/0046413 A1* | 2/2010 | Jin et al. | 370/315 |

FOREIGN PATENT DOCUMENTS

| | | | |
|---|---|---|---|
| EP | 0615391 A1 * | 9/1994 | H04Q 7/04 |
| EP | 14167526 | 10/2004 | |
| EP | 1515574 | 3/2005 | |
| JP | 2003318799 A | 11/2003 | |
| WO | 0036858 | 6/2000 | |
| WO | WO2007/069848 * | 6/2007 | H04L 12/18 |

OTHER PUBLICATIONS

Office Action issued in U.S. Appl. No. 13/620,617 mailed Apr. 10, 2013; 10 pages.

Office Action issued in Chinese Application No. 2008800070948.8 on Mar. 4, 2013; 16 pages.

Irvine, James et al.; "System Architecture for the Mostrain Project (Mobile Services for High Speed Trains)"; IEEE 47th Vehicular Technology Conference; Phoenix, Arizona; May 4-7, 1997; vol. 3, pp. 1917-1921.

Extended European Search Report issued in European Application No. 08702230.7 on Jan. 3, 2014; 8 pages.

Office Action issued in Chinese Application No. 2008800070948.8 on Sep. 11, 2013; 17 pages.

* cited by examiner

- In this example we assume, fixed RS uses alternate frame RS preamble scheme.
- Two types of MRSs. Lead RS (LRS) and Secondary RS (SRS). LRSs have direct connection to the fixed infrastructure (to a BS or a fixed RS). SRSs always go through their associated lead RS.

MOBILE RELAY COMMUNICATION SYSTEM

This application claims the benefit of U.S. provisional application Ser. No. 60/884,808 filed Jan. 12, 2007, the disclosure of which is incorporated herein by reference in its entirety.

A relay station (RS) is a device that is used to interconnect a base station (BS) and a mobile station (MS). By use of a RS, a BS may cover areas, such as the interior of a shopping center, building or parking deck, which would otherwise be inaccessible by the BS.

A mobile relay station (MRS) is an RS, which is capable of and intended to move while operating as a RS. An MRS is often affixed to a mobile platform, such as a train, bus, or airplane. In such an environment, there is a relatively defined relationship between the MRS and the MSs on the mobile platform. However, there may be a changing relationship between the MRS and various BSs as the mobile platform passes through coverage areas for provided by different BSs. In essence, the MRSs may be handed off from one BS or another as the MRSs move from on location to another. Depending on location or communication parameters, MRSs are capable of interacting with multiple BSs at the same or different times to facilitate communications between MSs supported by the MRS and a servicing BS or BSs.

Figure 1:
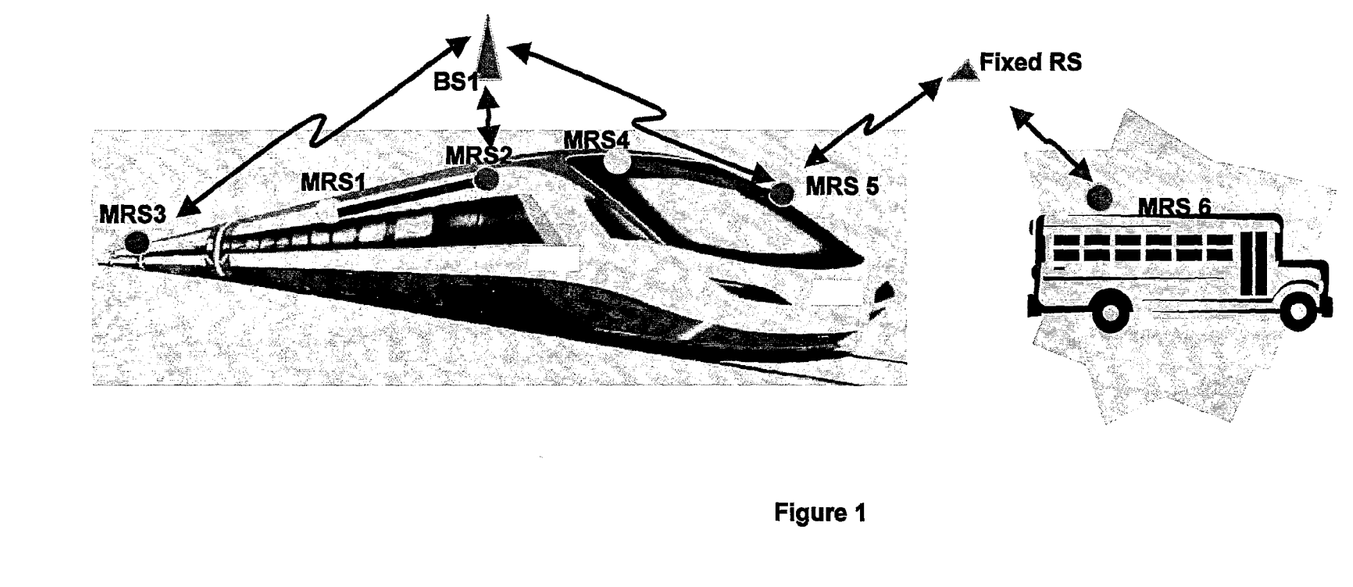
FIG. 1 illustrates an example diagram showing a number of mobile relay stations (MRS) and their connection to one or more base stations (BSs) and fixed relay stations (RSs).

The following provides an overview of the special issues related to MRSs and highlights key technologies that can support the smooth operation of MRSs. These issues include synchronization, neighborhood scanning, data delivery and path management, interference management, handoff related issues, and reliability (See FIG. 1).

Figure 2:
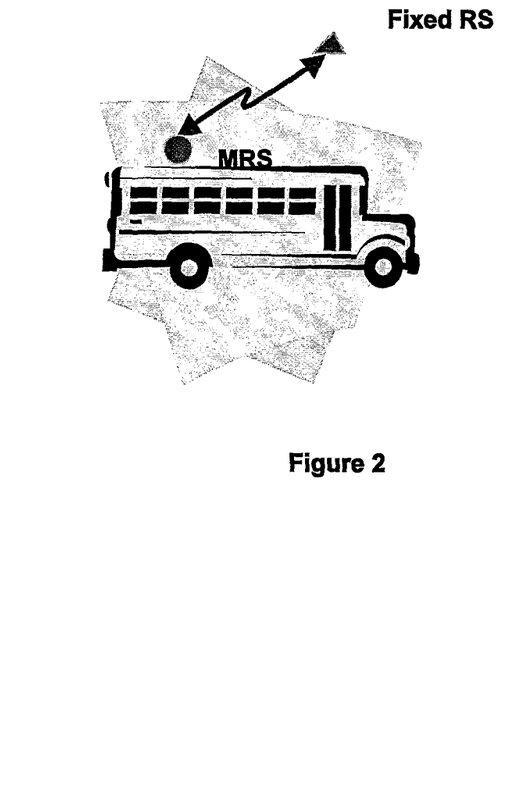
FIG. 2 illustrates an example diagram a first MRS type that does not support a child RS and where the MRS does not relay signals between a BS and one or more other RSs.

There are generally two types of MRSs. The first type of MRS does not need to support child RSs where the MRS does not relay signals between a BS and one or more other RSs (See FIG. 2). For example, the MRS may only relay signals between a BS and MSs. The second type of MRS does support child RSs where the MRS may relay signals between a BS and one or more other RSs (See FIG. 3). For example, the MRS may relay signals between a BS and other RSs, including MRSs, as well as MSs. The first type is generally sufficient for a bus whereas the second type is more applicable to trains or ships. The second type may be employed in a moving network.

Ideally, MRSs would have one or more of the following characteristics. MRSs should be able to monitor external RSs and quickly synchronize and connect or reconnect to them with minimum interruption to child RS and MS communications. Some MRSs need to support other child MRSs in the same mobile platform. These MRSs may need to synchronize using its parent MRS and also obtain help in forwarding data to/from MRs-BS. When an MRS is moving towards a fixed RS or MR-BS, there should be a means to quickly handover all the MSs to that RS. On the other hand, if they experience a good signal only for a short period of time, they should not connect to these fixed RSs, such as when a bus moves pass a bus station. When a mobile platform has multiple RSs, all of RSs may need to be handed over. This process should be done with relatively minimal disturbance and overhead.

When an MRS moves toward another MRS, if the MRSs carry the same PN code one needs to change its PN code and handoff all the MSs. This should be done with relatively minimal interruption. Handoffs between two MRSs in the same mobile platform should be done with minimum impact to MSs or even transparent to the MSs while minimizing the number of handoffs. When an MRS moves to another MRS region, the MSs connected to each other may try to cross connect. There should be a method to prevent that from happening. In addition, if the MRSs schedule in the same time, the interference among them would be large. Accordingly, such scheduling should be avoided.

The MRSs in a mobile platform should be able to connect via a better positioned MRS in the same vehicle if necessary. The system should support the case where MRSs connect to the fixed network via another MRS in the same vehicle. This would reduce the complexity and the number of handoffs and improve the connection reliability and coverage performance.

MRSs which do not need to act as a parent to other RSs are generally not required to transmit an RS preamble. Therefore, they can monitor RS preambles of fixed RSs/BSs for synchronization. When an MRS gets closer to a fixed RS, the MRS can first identify the fixed RS and then inform the fixed RS/MR-BS to facilitate any necessary actions, such as handoffs or coordinated interference avoidance. However, when an MRS moves into another MRS's coverage area, the above described detection process may not be adequate. Special means may be employed only for the MRSs, as described further below.

Having a separate operation scheme exclusively for MRSs makes the synchronization and neighborhood scheme of the overall system simple because fixed RSs do not require a fast neighborhood-monitoring scheme. For example, fixed RSs can have continuously synchronization using alternate RS hops by sending an RS preamble in alternate frames. The fixed RSs may not need to continuously monitor other RSs or may only need a very slow monitoring process because topology would usually be changed only with a new entry of a relay, a removal of a relay, or network based topology change.

As mentioned, when an MRS moves to another MRS area, the MRs cannot detect each other using the techniques described above and one of the following methods may be employed. For MS assisted discovery, the MSs connected to an MRS can detect the new MRS using the frame start preamble and report the MRS in their neighborhood profile. The MR-BS or the RS, which receives these measurements can observe these and organize means to address the resulting issues, such as interference and coordinated scheduling. If both MRSs use the same preamble, the BS can determine the locations of the MRSs using location detection techniques and use that to inform the MRSs. Once MRS determines that another MRS is using the same preamble, one of the MRSs may change its preamble and all the mobiles connected to that MRS need to be handed over to the MRS that maintains the preamble.

If the above detection scheme is not sufficient, the MRS can use the following technique. If the system uses a random preamble transmission and monitoring scheme for fixed RSs, the MRS can participate in the same process with a higher monitoring frequency than the fixed RS. If the system uses an alternate frame preamble mechanism, an MRS may occasionally transmit a preamble without impacting its own monitoring frequency so that other MRSs coming into contact can be detected.

The following technique are beneficial where a parent MRS supports one or more child MRSs, as may be the case for trains or ships. RS links within the mobile platform can operate either as in-band or out-of-band relays. The out-band relays would simplify the system design considerably as it would make overall synchronization and monitoring process simple and cause less interference problems. In this case, the MRSs that are allowed to have a connection with fixed RSs or MR-BSs would not transmit any preamble and do monitoring in all the frames. Thus, the MRSs can follow the same procedure as an MRS without a child RS, as described above. Detection of the case of an MRS moving into another MRS area can also use a similar method. The in-band relay should consider the interference it causes to the fixed structure transmissions which might need some extra scheduling coordination with the BSs. This may include, strict adherence to the RS and access/common zones in the frame structure as well as controlling transmit power within the mobile platform and coordinated scheduling with the BS.

In a vehicle only some RSs, referred to as lead RS (LRS), may be allowed outside access to the fixed RS/BS. The LRSs acquire synchronization from the external fixed RS/BS. This could be done by listening to alternate frame RS symbols or based on the random monitoring scheme (RMS), if the required minimum monitoring time for synchronization can be achieved using RMS. The other MRSs may have to acquire synchronization using an LRS as explained below. Supporting the Synchronization of Child MRSs may be done by (a) using the same synchronization method used by the fixed RSs or (b) having a separate preamble called an MRS preamble for the MRSs.

If a fixed RS uses the random preamble transmission and monitoring scheme (RPTMS) for both synchronization and neighborhood monitoring, all the MRSs can use the same scheme with additional identification processes to avoid connecting the MRS to fixed RSs. If a fixed RS uses alternate frame preamble transmission scheme (AFPTS), which transmits the preamble in alternate frames for successive hops, the secondary MRSs can also use the same method to synchronize to the LRSs. However, when the RS connected to the fixed RS provides a handoff to another fixed RS with a different preamble transmission cycle, all of the internal hops within the mobile platform has to switch to alternative slots. In addition, if fixed RSs do not use a separate system for neighborhood scanning, LRSs may need to send a separate preamble in different frames (e.g. use RPTMS scheme).

Thus, each MRS can listen to its parent MRS preamble and synchronize with it. By having a separate preamble only for MRS, which is only a small portion of the whole network system, complexity can be reduced. If the fixed RSs use the AFPTS RS preamble method for synchronization, it is generally better not to transmit an RS preamble Using the MRSs because the MRSs can synchronize and listen for neighborhood scanning using the preamble transmitted by the fixed RSs and BS and use a separate preamble, referred to as an MRS Preamble. This is because MRS network is only a small portion of the whole network system and complexity can be reduced by this modification in the MRS. This would allow the MRS to identify the approach of another MRS as well.

An MRS can transmit the MRS preamble in two different cycles as per the AFPTS method. In order to avoid collisions between MRSs that have the same preamble and are moving towards each other, a frame number is generated using the PN code of the MRS preamble. This means if two RSs have the same preamble, they would be allocated two different slots for MRS preamble transmissions to provide another dimension where MRS-to-MRS collisions can be prevented or identified. This may be done using a centralized means to allocate the preambles and MRS preamble slots to transportation vehicles. Another way of identifying the case where two leading MRSs with the same preamble getting closer to each other is by sharing information within a group of MRSs when they are connected. If multiple MRSs are in the same vehicle, although one may have the same preamble with an incoming MRS others could identify it and inform to the one having he same preamble. Basically, this is important when two lead RSs of a cluster have the same preamble and moves toward each other. The other cluster members can identify it and inform the lead RS in that case. Using this, an MRS can identify when another MRS is moving toward it, and if the preambles are same, change the preambles.

Figure 4:
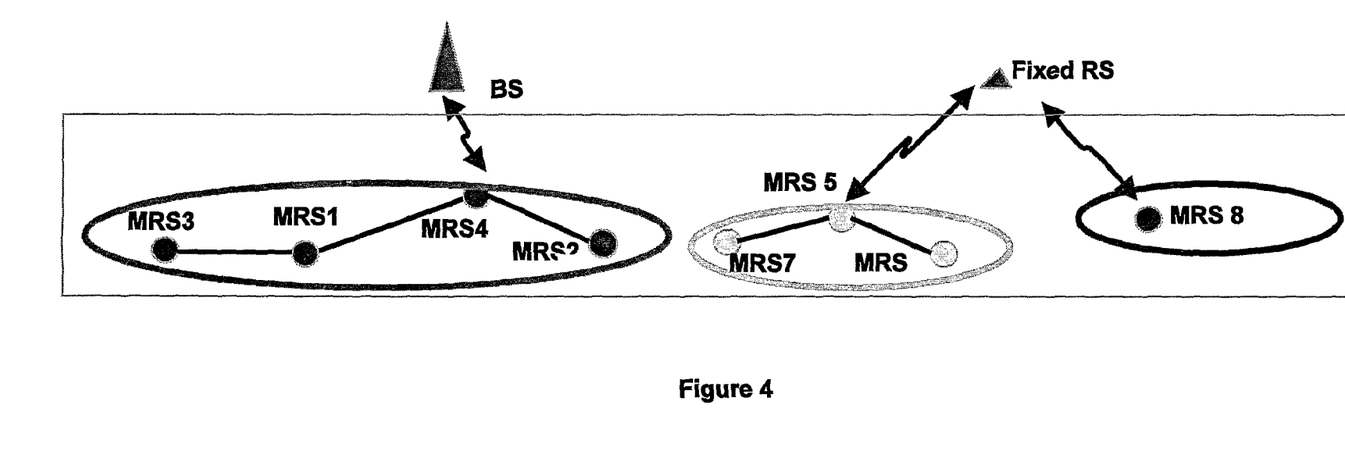
FIG. 4 illustrates an example diagram a MRS cluster, a group of MRSs (one or more) having a wireless connection to each other either directly or through one of the MRSs in the same cluster.

The following addresses accessing base stations and organizing MRS-to-MRS links within a transportation system. In the most generic case, one can set up the system as multiple, disjoint clusters in a single vehicle serving different MSs. A MRS cluster is defined as a group of MRSs (one or more) having a wireless connection to each other either directly or through one of the MRSs in the same cluster (See FIG. 4).

In the most simple case, there can be one cluster, and only one MRS (lead MRS) of this cluster is allowed the connection to the external fixed wireless system (RS or BS). In another case, each cluster has only one MRS where each MRS has a connection to an external fixed RS and only servers its own MSs. In yet another case, more than one MRS in a cluster is allowed direct access to the external fixed RS/BS. Each MRS in the vehicle separately connects to the outside infrastructure. This means the MRSs can be synchronized with the fixed RSs without having to transmit another preamble. When an MS moves from one place in the vehicle to another, the handover would be time consuming as it involves a fixed-RS or MR-BS in the process. Only a single selected MRS (LRS) within the vehicle may be allowed direct access to the fixed infrastructure.

Figure 3:
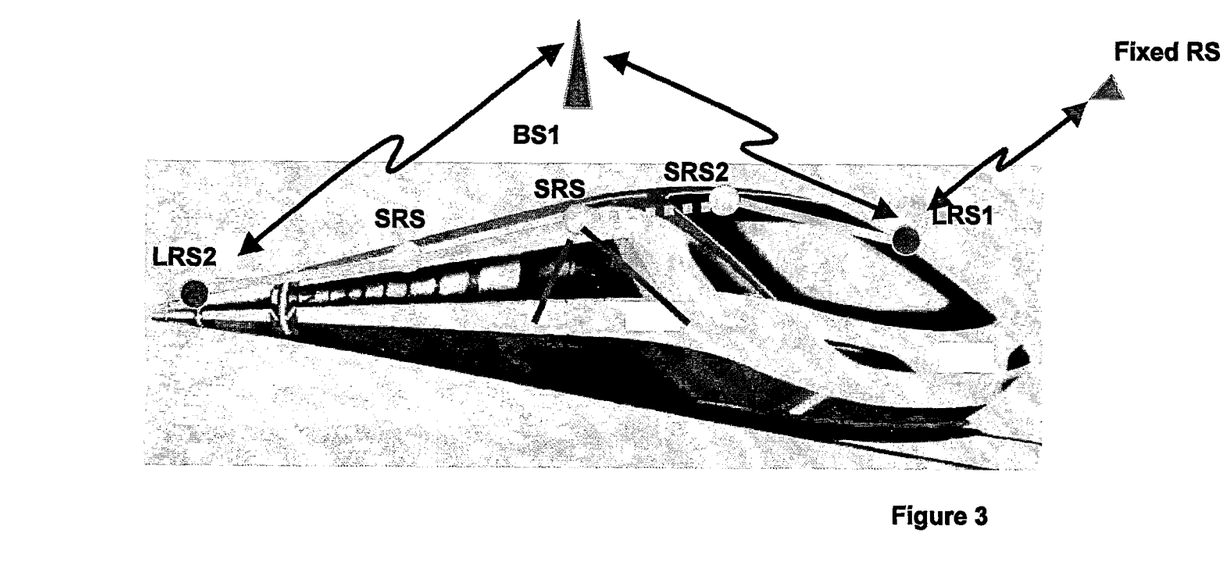
FIG. 3 illustrates an example diagram a second MRS type that supports one or more child RSs where the MRS may relay signals between a BS and one or more other RSs.

Other secondary RSs (SRS) would connect through LRSs. This would reduce the complexity and the number of handoffs, but performance may not be as good as the first example because all the other RSs rely on one RS. Multiple MRSs in a vehicle can act as LRSs. This would reduce the number of handoffs and improve the connection reliability and coverage performance. If at least one MRS can connect to the external fixed RS, the whole vehicle area can be covered. In FIG. 3, two LRSs are located at the front and rear of a train and various SRSs are located between the LRSs to improve connection reliability and performance. The MRSs in a moving vehicle are allowed to connect to the better positioned MRS in the same vehicle, if necessary, in a dynamic manner.

The following addresses techniques to reducing handoffs while MSs are moving within the vehicle or when the vehicle moves across different fixed access points (RS or BS). For this purpose, the same preamble transmissions may be used within the clusters. Several different schemes are possible. First, all of the MRSs in the vehicle may send the same frame start preamble (Transparent Relay group). This options makes all the RSs looks alike to the MS and from the MS point of view only a single RS can be seen. This reduces the handoffs among the MRSs within the vehicle. In addition, when an RS is handed off to a different fixed access point, the procedure is less complex. When multiple LRSs are used per cluster, all of the LRSs may be connected to the access points that belong to the same MR-BS.

Second, MRSs within a cluster may use the same frame-start preamble. In this case, the idea is to keep the topology within a cluster simple by each cluster having one LRS. Third, all of the MRSs in the vehicle use different frame start preambles. An LRS in the group may handover to another fixed RS/BS when moving. Two LRSs belong to the same cluster may or may not be connected to a different MR-BS. If they do not belong to the same MR-BS special provisions are necessary. The following description assumes a single cluster operation within a vehicle. However, the same scheme applies even when multiple clusters are in operation.

The following relates to managing paths and data delivery within the transparent clusters. There are several architectures under which a cluster can operate. For locally centralized or locally distributed controlling, even when multiple LRSs are in a cluster to facilitate multiple connection points to external fixed RSs/BSs, a central RS node can do all the control functions such as scheduling within the cluster. In the distributed case, interference control may be an issue as MRS nodes may interfere with the external fixed RSs and coordination with the external fixed RS is difficult due to multiple controlling points.

To control interference within the cluster, transmissions to two or more MSs at the same time may be allowed if they are in different regions without causing interference to each other. For this purpose, neighborhood measurements can be used. When transmitting to two mobiles at the same time, an RS can schedule them in the same time slot under a decentralized scheme or the BS can assign the same time slot assignment for both knowing the interference situation. A similar method can be used for the uplink transmissions.

For locally centralized or locally distributed forwarding, when the access points change dynamically, in the locally centralized scheme, all the data to and from the external fixed RS are received first by a particular MRS node and then forwarded to the destination(s). In the distributed scheme, all of the RS nodes are updated. All of the MSs connected to each MRS are connected to the external nodes. These paths are used to forward data from node to node. In most of the cases, the MRSs within the vehicle can be pre-arranged and be known so that each other could act in a more organized manner. In that case, the RSs inside the vehicle act like a cluster, which has locally planned paths to each other. MRSs may possess the path information about each other and the locally distributed scheme.

Either in the locally centralized or distributed case, there can be one or more RSs which send data simultaneously, if the MS received good signals from multiple RSs. Therefore, more than one RS in the cluster can keep a given MS in its data base as a forwarding node. That means some nodes may forward the same data to other RSs for forwarding while they are also transmitting to the MS. This accomplishes two types of diversity. One is where there are multiple LRSs that can send two packets to the MS via two RSs or combine them at one node and send them by one node. The other is where multiple RS-MS links are provided for diversity. Duplication can be avoided using sequence numbers. In the uplink, multiple RSs may receive packets from the MS and send them to the MR-BS after combining at a local point or separately send them to the BS for combination at the BS. Those RSs are identified as a supporting RS to the MSs for data forwarding.

The following relates to managing paths and data delivery within the transparent clusters. For an MS handoff from RS to RS, although this is transparent from the point of view of the MS, the MRSs update their tables after identifying the handoff. Notably, a handoff in this case means the update of the association of that MS to the RS. When an LRS disconnects from the external fixed RS, the information is fed to all the nodes quickly informing them of the disconnection. Information about a new connection to the external fixed RSs provided in a similar way. Therefore, at any time, all the MRSs know the best path(s) to the external network. This could be done dynamically without the knowledge of the MR-BS.

In a fully centralized scheme, the MR-BS may keep track of which MS belongs to which LRS. When an MS moves from one LRS area to another (including its SRSs), the change is noted by the MR-BS, but no handover is initiated. When transmitting data to the MSs, a different LRS may send data to its mobiles simultaneously if they do not interfere with each other. This can be accomplished by using a broadcast ID so that two MRSs send different data to two different MSs.

The following addresses issues related to another MRS Cluster moving close to an MRS Cluster. Since an MRS cluster may have a fixed topology within the cluster, each MRS knows to what MRS will receive a transmitted preamble. Therefore, by informing ahead of time, an MRS can change the RS preamble transmission frame according to an agreed upon. This may be done in random intervals without impacting minimum synchronization time and giving sufficient synchronization time for the newly entered RSs to synchronize to the MRS preamble. This way, the MRSs can monitor differently timed MRS preambles and identify the other MRSs that are getting closer to a given MRS or MRS cluster. Note that in this case, the lead MRS has to send one preamble, if the alternate frame preamble transmission scheme is used.

When an MRS observes the same preamble in a different cycle, the MRS can identify that it has meet another moving MRS with the same preamble. As such, the MRS can identify an approaching MRS that is using the same preamble. The same scheme can be applied to the fixed RS systems if the idle and sleep mode is not used in the fixed RS systems, in which case special messaging may be required.

Figure 5:
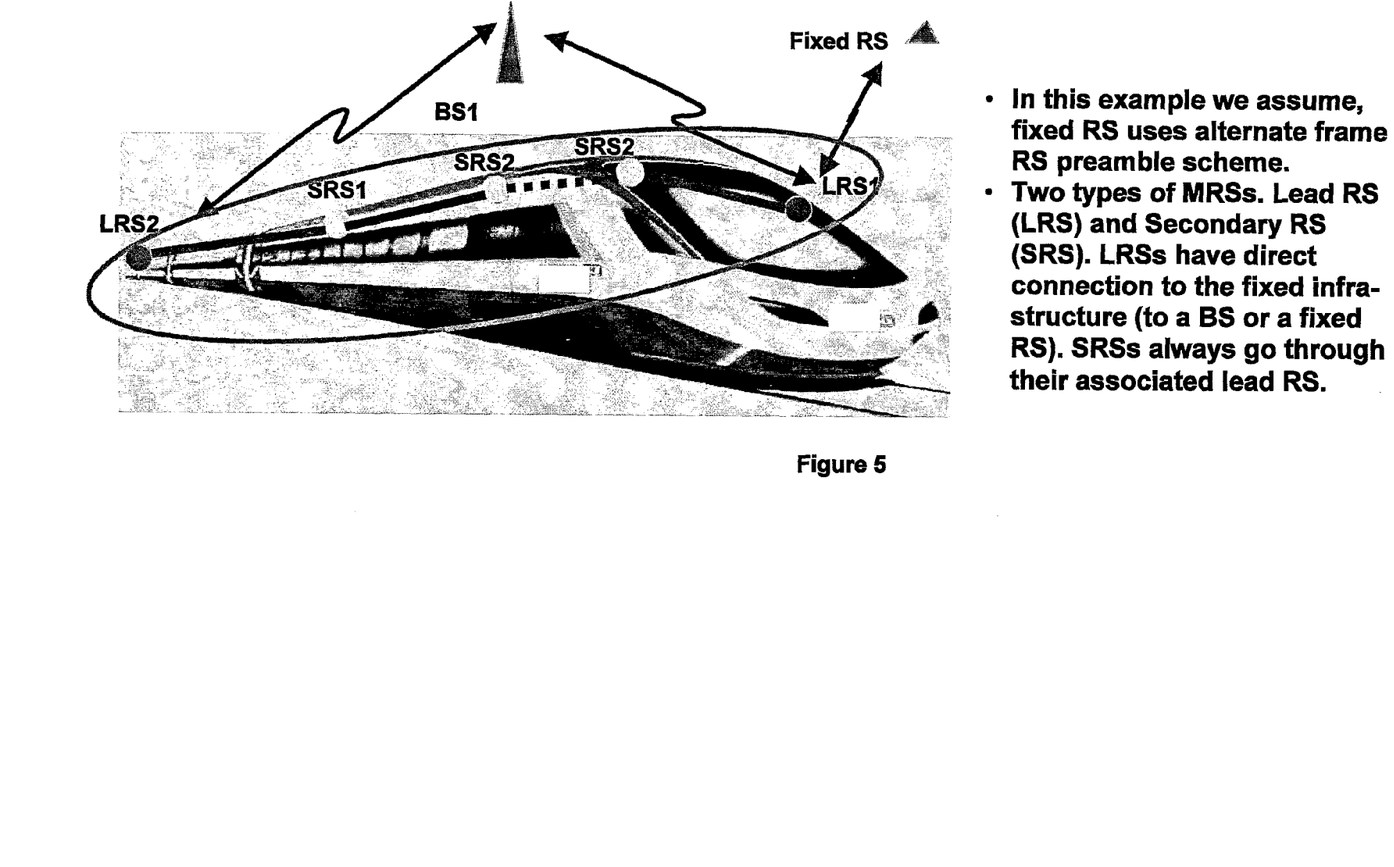
FIG. 5 illustrates an example diagram of a fixed RS using an alternate frame RS preamble scheme.
Figure 6:
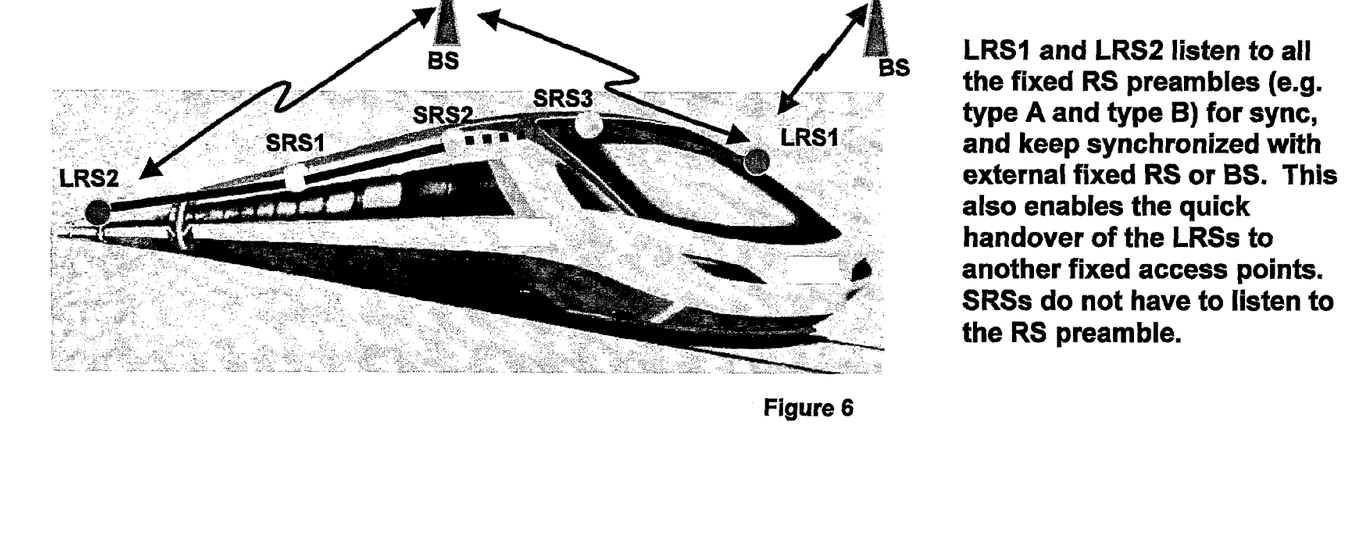
FIG. 6 illustrates an example diagram of lead relay stations (LRSs) listening to one or more fixed RS preambles for synchronization and keeping synchronized with external fixed RS or BS.

In FIGS. 5 and 6, a train is covered by two LRSs located at the front and last compartments. From time to time, depending on the link from the LRS to an outside fixed RSs/BS, SRSs may use one of those LRSs to communicate with the fixed RSs/BSs. A snap shot when both LRSs have good connections to external fixed RSs is shown where the solid lines are now active links. Dotted links may become active if LRS1 or LRS2 fails to connect to an external fixed access point. All LRSs and SRSs do not transmit RS preamble but transmit the frame start preamble. All RSs belong to same MRS cluster. All have the same PN code and the same preamble (transparent RS). So when an MS moves from one RS coverage area to other it is transparent to the MS. All the MRSs update the information so that data can be forwarded to the new RS. This may also be transparent to the MR-BS in a decentralized scheme.

All MRSs send an MRS preamble that is in a different frame from the RS preamble frame used for fixed RSs. MRSs listen to each other's preamble and establish synchronization using an alternate frame preamble structure similar to the one used by fixed RSs. For example, SRS1 and SRS3 can use odd frames and SRS2 can use even frames. An MRS preamble has a different pattern and preferably a relatively low power, which is just sufficient to reach the neighbor MRS such that it would not be confused by the other fixed RSs as an RS preamble. Neighboring fixed RSs or BSs may use the same slot for data transmission but since the in-vehicle relays may be located close by, one may assume that the interference would not impact the preamble and the synchronization process. Otherwise, the neighboring BSs/RSs need to be advised not to use that slot when an MRS is in the close vicinity.

The following relates to handoff procedures and network entry. Initially an MS will choose an anchor RS during network entry. Upon network entry identifies the cluster as one group and tries to connect to it. Since all MRSs may send the same preamble, the signal may appear as a large MRS to an MS. However, the RSs can report the MSs received signal strengths (during UL ranging) to a pre-selected RS within the cluster (locally centralized case), or the MR-BS (centralized case) and depending on these signal strengths a decision as to where the MS should be anchored can be made and send via the UL frame alignment adjustment to the MS.

After network entry, the cluster identifies that the MS is attached to one of its MRSs. This can either be transparent to the MR-BS (locally-centralized) or informed to BS (centralized). In the locally centralized case, all the handoffs among the cluster are transparent to both BS and MS, which is a significant benefit to the network. In this case, the MR-BS can send data to the cluster using MSID or RS Cluster ID and the cluster can facilitate data forwarding. However, the path tables in the cluster may have to be changed during a handoff within the cluster. In addition, the MS may need to do uplink frame alignment with the new RS for which a ranging request may need to be issued. When a moving cluster moves within the same MR-BS area as another, only the lead RS, which is the one connected with the BS, needs to handover and nothing else need to be changed within the cluster or among the MSs.

This document describes some technologies to be used for the operation of moving relays and more specifically to the case where a group of moving RSs move in a common platform such as a train or a ship. The high level issues and solutions for different scenarios that can be experienced by moving RSs have been discussed. Some of these techniques may be applied to fixed relay operation as well.

What is claimed is:

1. A mobile relay system for supporting communications between a fixed station and mobile terminals comprising a plurality of mobile relay stations that are associated with each other and provided on a moving platform, wherein each of the plurality of mobile relay stations is capable of facilitating communications with mobile terminals within communication range of the plurality of mobile relay stations and at least one of the plurality of mobile relay stations is further capable of facilitating communications with a fixed station within communication range of the at least one of the plurality of mobile relay stations, and wherein at least one of the plurality of mobile relay stations is configured to identify a neighboring mobile relay station based on a neighborhood profile of a mobile terminal.

2. The mobile relay system of claim 1 wherein the fixed station is a fixed relay station.

3. The mobile relay system of claim 1 wherein the fixed station is a fixed base station.

4. The mobile relay system of claim 1 wherein the plurality of mobile relay stations are affixed to the moving platform and have a fixed relationship with respect to one another.

5. The mobile relay system of claim 1 wherein the plurality of mobile relay stations define a cluster, wherein each of the plurality of mobile relay stations has a wireless connection to the other mobile relay stations.

6. The mobile relay system of claim 5 wherein the cluster appears as a single relay station to the mobile terminals regardless of which of the plurality of mobile relay stations are serving the mobile terminals.

7. The mobile relay system of claim 5 wherein the cluster appears as a single relay station to the fixed station regardless of which of the plurality of mobile relay stations are communicating with the fixed station.

8. The mobile relay system of claim 5 wherein the cluster is handed off from the fixed station to a second fixed station as the moving platform moves from a first area supported by the fixed station to a second area supported by the second fixed station.

9. The mobile relay system of claim 8 wherein service for the mobile terminals is maintained by the cluster throughout the handoff.

10. The mobile relay system of claim 1 wherein certain of the plurality of mobile relay stations are adapted to communicate with each other to facilitate relaying communications between the fixed station and a mobile terminal via at least two of the plurality of mobile relay stations.

11. The mobile relay system of claim 1 wherein each of the plurality of mobile relay stations is adapted to communicate with the fixed station.

12. The mobile relay system of claim 1 wherein only certain of the plurality of mobile relay stations are adapted to communicate with the fixed station, and other ones of the plurality of mobile relay stations are adapted to communicate with at least one of the certain of the plurality of mobile relay stations to facilitate communications with the fixed station.

13. The mobile relay system of claim 1, wherein each of the plurality of mobile relay stations is configured to not transmit a synchronization preamble.

14. The mobile relay system of claim 1, wherein at least one of the mobile relay stations is further configured to transmit uplink alignment information to a mobile terminal.

15. The mobile relay system of claim 1, wherein each of the plurality of mobile relay stations is configured to transmit a common synchronization preamble.

16. A method performed at a mobile relay station for supporting communications between a fixed station and mobile terminals comprising:
facilitating communications with mobile terminals within communication range of the mobile relay station;
facilitating communications with a fixed station within communication range of the mobile relay station; and
identifying a neighboring mobile relay station based on a neighborhood profile of a mobile terminal.

17. The method of claim 16 wherein the fixed station is a fixed relay station.

18. The method of claim 16 wherein the fixed station is a fixed base station.

19. The method of claim 16 wherein a plurality of mobile relay stations are affixed to a moving platform and have a fixed relationship with respect to one another.

20. The method of claim 16 wherein the mobile relay station is one of a plurality of mobile relay stations, the plurality of mobile relay stations defining a cluster, wherein each of the plurality of mobile relay stations of the cluster has a wireless connection to the other mobile relay stations in the cluster.

21. The method of claim 20 wherein the cluster appears as a single relay station to the mobile terminals regardless of which of the plurality of mobile relay stations are serving the mobile terminals.

22. The method of claim 20 wherein the cluster appears as a single relay station to the fixed station regardless of which of the plurality of mobile relay stations are communicating with the fixed station.

23. The method of claim 20 wherein the cluster is handed off from the fixed station to a second fixed station as a moving platform moves from a first area supported by the fixed station to a second area supported by the second fixed station.

24. The method of claim 23 wherein service for the mobile terminals is maintained by the cluster throughout the handoff.

25. The method of claim 16 further comprising communicating with another mobile relay station, and relaying communications between the fixed station and a mobile terminal via the mobile relay station and at least one other mobile relay station.

26. The method of claim 16 wherein the mobile relay station is adapted to communicate with the fixed station.

27. The method of claim 16 further comprising communicating with the fixed station, and communicating with at least one other mobile relay stations to facilitate communications with the fixed station.

28. The mobile relay system of claim 1 wherein identifying a neighboring mobile relay station comprises identifying a neighboring mobile relay station based on a frame preamble from one or more of a neighboring fixed station or a neighboring mobile relay station.

29. The method of claim 16 wherein identifying a neighboring mobile relay station comprises identifying a neighboring mobile relay station based on a frame preamble from the one or more of the neighboring fixed station or the neighboring mobile relay station.

30. A mobile relay system for supporting communications between a fixed station and mobile terminals comprising a plurality of mobile relay stations that are associated with each other and provided on a moving platform, wherein each of the plurality of mobile relay stations is capable of facilitating communications with mobile terminals within communication range of the plurality of mobile relay stations and at least one of the plurality of mobile relay stations is further capable of facilitating communications with a fixed station within communication range of the at least one of the plurality of mobile relay stations, and wherein at least one of the plurality of mobile relay stations is configured for identifying a neighboring mobile relay station based on a neighborhood profile of a mobile terminal.

31. The mobile relay system of claim 30 wherein the identifying a neighboring mobile relay station comprises monitoring a frame preamble of one or more of a neighboring fixed station or a neighboring mobile relay station.

* * * * *